[118]
No. 118,696.
Horace H. Day's Improvements in Elevated or Underground Railroads.
Patented Sep. 5, 1871.
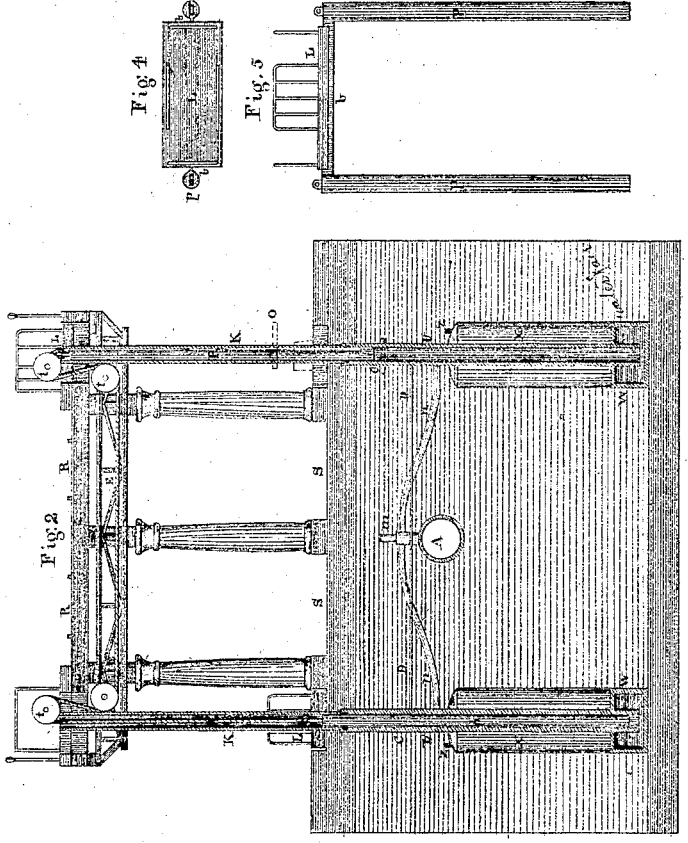

UNITED STATES PATENT OFFICE.

HORACE H. DAY, OF BLOOMINGDALE, NEW JERSEY.

IMPROVEMENT IN COMBINED HYDRAULIC AND PNEUMATIC ELEVATORS FOR RAILROADS.

Specification forming part of Letters Patent No. 118,696, dated September 5, 1871.

*To all whom it may concern:*

Be it known that I, HORACE H. DAY, of Bloomingdale, in the county of Passaic and State of New Jersey, have invented certain Improvements in Elevated or Underground Railroads, of which the following is a specification:

The intention and object of my invention are, by means of a certain combination of air and water-chambers, connected with suitable cylinders, guides, and plungers, or pistons and platforms, to use compressed air as a motive power, which may be compressed either by steam, wind, or water-power, and transmitted in pipes long distances, which, pressing upon water contained in suitable chambers, causes the latter to flow into the cylinders containing the plungers or pistons, whereby the pistons or plungers are lifted or raised as far as they are intended to go, carrying with them suitable platforms, upon which persons and goods may be placed, and thus be raised or lowered from one level to another, according as they may desire, the time of operating being under perfect control by means of suitable valves and connections for operating them. The second part of my invention relates to the combination of elevators with elevated or underground railroads, whereby a great saving of labor is effected and facilities afforded for conveying passengers and goods to or from said elevated or underground railroads to the level of the street, road, or natural ground, or other desired level.

Figure 1 is a side elevation of a road or street, S S, and an elevated roadway above, R R, supported upon columns, and the main air-pipe A passing under ground, and also a side view of one of the elevators in section. Fig. 2 is an end sectional elevation of the same through the line I I, showing two elevators, one on each side the street or roadway, (partly in section,) connected by pipes suitable for the purpose to the main air-pipe, and having valves, connected by rods or suitable means, in order that they may be operated by a person stationed near. Fig. 3 is a plan of the two elevators and the main air-pipe, showing the connecting-pipes and rods for operating them. Fig. 4 is a plan of the elevator-platform and plungers. Fig. 5 is an elevation of the same, showing their connection and construction.

The same letters refer to the same parts in the drawing.

$c\ c$ are the working-cylinders of the elevators, and $p\ p$ are the pistons or plungers. $k\ k$ are guide-tubes to preserve the plungers vertical when at their highest points, and which, for convenience, may be made to take off in order to insert fresh packing-rings in the cylinders. The guide-tubes have slots extending their whole length for the connecting-bars to move in, which connecting-bars $b$ unite the pistons together, Fig. 5, and support the platform L. The cylinders are connected together by the water-chambers W, which have the air-and-water chambers $x\ x$ in the center thereof. $v\ v$ are two two-way valves, one upon each air-and-water chamber, connected by the pipes $n\ n$ to the stop-valve $m$ in the main air-pipe A. $z\ z$ are provided for filling the chambers with water, which should always be full when the elevator is down. It is intended that $z\ z$ be connected by pipes and valves to a water-main or a cistern, in order to supply the loss resulting from evaporation. D D are rods connecting the valves $v\ v$, and H H are rods connecting with the hand-lever O, by which the operator in charge opens and closes the valves for the admission and escape of the compressed air to and from the air-and-water chambers $x\ x$, the valves $v\ v$ of which are so arranged that, when the compressed air is admitted to the air and water-chamber of one elevator situated on one side the street or road, the air is escaping from the other, located on the opposite side of the road, causing one elevator-platform to ascend while the other descends. And, in order to economize the working power, the pistons and platform of one elevator are connected, by means of suitable ropes or chains E E passing partly round the pulleys $t\ t$, to the pistons and platform of the other elevator in such mode as to make them balance each other, as shown in Fig. 2; and the whole is so arranged that when the lever O is pulled in one given direction the compressed air is admitted to one of the air-and-water chambers $x$, and forces the water contained therein through the water-chamber W into the cylinders $c\ c$, causing the pistons $p\ p$ to be forced upward, carrying the platform, with its passengers and goods along with it. But as the same motion of the lever shuts off the compressed air from the air-and-water chamber of the opposite elevator and allows the compressed air contained therein to escape, the weight of the platforms and pistons, &c., hanging on the ropes or chains E E, combined with the air-pressure lifting the other elevator, will cause it to descend, driving the water in the cylinders $c\ c$ back into the air-and-water chamber $x$, and so on alternately, as will be readily understood. When the lever O is moved in the opposite direction the pressure of the compressed air on the opposite or lower side will now cause that to ascend, and the pressure being removed from beneath the upper one will cause it to descend, and so on alternately and continually, one ascending while the other is descending, thereby affording great facilities and economy in the working of such railroads.

This kind of elevators is also applicable to other useful purposes.

I claim—

1. The combination of the main air-pipe containing compressed air with the air-and-water chambers $x$, the water-chambers W, the cylinders and pistons $c\ c$ and $p\ p$, the platform L, the hollow guide-tubes $k\ k$ with the ropes and pulleys E and $t$, as described.

2. The elevating and lowering persons and merchandise by compressed air applied and operated by the devices and in the manner substantially as described.

HORACE H. DAY.

Witnesses:
E. F. HARTE,
GEO. F. SEYMOUR.        (118.)